United States Patent

Kobayashi et al.

[11] Patent Number: 5,454,979
[45] Date of Patent: Oct. 3, 1995

[54] FLUOROSILICONE ANTIFOAM

[75] Inventors: Hideki Kobayashi; Toru Masatomi, both of Chiba, Japan

[73] Assignee: Dow Corning Toray Silicon Co., Ltd., Tokyo, Japan

[21] Appl. No.: 111,807

[22] Filed: Aug. 25, 1993

[30] Foreign Application Priority Data

Aug. 27, 1992 [JP] Japan .................................. 4-252052

[51] Int. Cl.$^6$ .................................................. B01D 19/04
[52] U.S. Cl. .......................... 252/358; 252/321; 208/348; 203/20
[58] Field of Search ..................... 252/321, 358; 203/20; 208/348

[56] References Cited

U.S. PATENT DOCUMENTS

| | | | |
|---|---|---|---|
| 2,961,425 | 11/1960 | Pierce et al. | 556/454 |
| 3,115,472 | 12/1963 | Currie | 252/358 |
| 3,639,260 | 2/1972 | Michalski | 252/321 |
| 4,537,677 | 8/1985 | Keil | 252/358 |
| 4,597,894 | 7/1986 | Abe et al. | 252/358 |
| 5,283,004 | 2/1994 | Miura | 252/358 |

FOREIGN PATENT DOCUMENTS

| | | |
|---|---|---|
| 02052007 | 8/1988 | Japan .................................. 252/358 |
| 85 | 1/1990 | Japan . |
| 42042 | 7/1992 | Japan . |
| 42043 | 7/1992 | Japan . |
| 880601 | 10/1961 | United Kingdom . |

OTHER PUBLICATIONS

Derwent Abstract, AN 87-346177/49 (corresponding to JP 92 042042) (1987).
Derwent Abstract, AN 90-102489/14 (corresponding to JP 02-05207-A) (1990).
Derwent Abstract, AN 90-257423/34 (corresponding to JP 92042043) (1990).

Primary Examiner—Gary L. Geist
Assistant Examiner—Daniel S. Metzmaier
Attorney, Agent, or Firm—James L. DeCesare

[57] ABSTRACT

A fluorosilicone antifoam having excellent and persistent anti foam activity against foaming in aqueous or organic solvent solutions in which a silicone surfactant or fluorosurfactant is dissolved. The fluorosilcione antifoam includes (A)

(a) a fluorosilicone oil with the general formula $$F(CF_2)_aC_2H_4SiMe_2O(Me_2SiO)_nSiMe_2C_2H_4(CF_2)_aF$$

in which a is an integer with a value of at least 4, n is an integer with a value of 0 to 300, and Me is methyl, or (b) a fluorosilicone oil with the general formula $$XR_2SiO[F(CF_2)_aC_2H_4SiMeO]_nSiR_2X$$

in which R is a monovalent hydrocarbon group, X is the $F(CF_2)_aC_2H_4$ group or a monovalent hydrocarbon group with the proviso that at least 1 of X is the $F(CF_2)_aC_2H_4$ group, n is an integer with a value of 1 to 300, and a is an integer with a value of at least 4;

(B) microparticulate silica with a specific surface of at least 50 m$^2$/g; and (C) a fluoroalkyl-containing alkoxysilane with the general formula $$F(CF_2)_bC_2H_4Si(OR^1)_3$$

in which b is an integer with a value of at least 1 and R$^1$ is a monovalent hydrocarbon group having no more than 6 carbons or partial hydrolyzates thereof.

1 Claim, No Drawings

FLUOROSILICONE ANTIFOAM

BACKGROUND OF THE INVENTION

The invention relates to a fluorosilicone antifoam and, more specifically, to a fluorosilicone antifoam that exhibits an excellent and durable antifoam activity on the foaming of aqueous or organic solvent solutions in which a silicone surfactant or fluorosurfactant is dissolved.

Compared to nonsilicone antifoams such as alcohols, esters, mineral oils, and synthetic oils, silicone antifoams exhibit a superior antifoam activity at smaller additions and as a result are widely used for defoaming and foam suppression in foaming-prone industrial processes in waste water treatment, dyeing, fermentation, the latex industry, the cement industry, the paint industry, the adhesives industry, the petroleum industry, and so forth. These silicone antifoams generally take the form of an oil compound whose base components are principally dimethylpolysiloxane and silica micropowder or an emulsion in which such an oil compound is dispersed in water along with a surfactant.

However, a drawback of these silicone antifoams is their very weak antifoam activity with respect to the foaming of aqueous or organic solvent solutions in which silicone surfactant or fluorosurfactant is dissolved. In response to this, Japanese Patent Publication Number Sho 35-12564 [12,564/1960] has proposed an antifoam based on perfluoroalkylsiloxane, but this antifoam does not have a completely satisfactory antifoam activity. Japanese Patent Publication Number Hei 2-85 [85/1990] teaches an antifoam that is based on a perfluoroalkyl-containing organopolysiloxane that also contains specific functional groups. However, this anti foam is effective only against the foaming of organic solvent solutions in which a fluorosurfactant is dissolved.

Silicone antifoams consisting of silicone oil and hydrophobicized microparticulate silica have also been proposed (Japanese Patent Publication Numbers Hei 4-42042 [42,042/1992] and Hei 4-42043 [42,043/1992]), but this type of silicone antifoam does not develop a satisfactory antifoam activity.

SUMMARY OF THE INVENTION

The inventors achieved the present invention as the result of extensive research directed at solving these drawbacks to the prior art. The present invention takes as its object the introduction of an antifoam that exhibits an excellent and persistent antifoam activity on the foaming of aqueous or organic solvent solutions in which a silicone surfactant or fluorosurfactant is dissolved.

These and other features, objects, and advantages of the present invention will become more apparent from a consideration of the following detailed description thereof.

DETAILED DESCRIPTION OF THE INVENTION

The instant invention relates to a fluorosilicone anti foam that consists of (A) 100 weight parts of (a) a fluorosilicone oil with the general formula $$F(CF_2)_aC_2H_4SiMe_2O(Me_2SiO)_nSiMe_2C_2H_4(CF_2)_aF$$

in which a is an integer with a value of at least 4, n is an integer with a value of 0 to 300, and Me=methyl, or (b) a fluorosilicone oil with the general formula $$XR_2SiO[F(CF_2)_aC_2H_4SiMeO]_nSiR_2X$$

in which R is a monovalent hydrocarbon group, X is the $F(CF_2)_aC_2H_4$ group or a monovalent hydrocarbon group with the proviso that at least 1 of X is the $F(CF_2)_aC_2H_4$ group, n is an integer with a value of 1 to 300, and a is an integer with a value of at least 4;

(B) 1 to 50 weight parts microparticulate silica with a specific surface of at least 50 m$^2$/g; and (C) 0.01 to 25 weight parts of a fluoroalkyl-containing organosilicon compound that is selected from the group consisting of (c) a hydroxyl-endblocked fluorosilicone oil with the general formula $$HO[F(CF_2)_bC_2H_4SiMeO]_xH$$

in which b is an integer with a value of at least 1 and x is an integer with a value of 1 to 20, (d) a cyclic fluorosilicone oil with the general formula

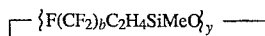

in which b is an integer with a value of at least 1 and y is an integer with a value of 3 to 8, and (e) a fluoroalkyl-containing alkoxysilane with the general formula $$F(CF_2)_bC_2H_4Si(OR^1)_3$$

in which b is an integer with a value of at least 1 and $R^1$ is a monovalent hydrocarbon group having no more than 6 carbons or partial hydrolyzates thereof.

The fluorosilicone oil comprising component (A) in the antifoam of the invention is the base or main component of the present invention. This fluorosilicone oil has either the following general formula (a)

$$F(CF_2)_aC_2H_4SiMe_2O(Me_2SiO)_nSiMe_2C_2H_4(CF_2)_aF$$

or the following general formula (b)

$$XR_2SiO[F(CF_2)_aC_2H_4SiMeO]_nSiR_2X.$$

The fluorosilicone oil with general formula (a) has the preceding formula in which a is an integer with a value of at least 4, for example, 4, 6, and 8. This fluorosilicone oil encompasses mixtures in which a has several values. The subscript n is an integer with a value of 0 to 300. While the fluoroalkyl groups at the two terminals function to reduce the surface tension, this effect is abolished when n exceeds 300.

Fluorosilicone oils with general formula (a) can be synthesized, for example, by the hydrolysis of fluoroalkyldimethylchlorosilane alone, by the cohydrolysis of fluoroalkyldimethylchlorosilane and dimethyldichlorosilane, and by the polymerization in the presence of polymerization catalyst of cyclic dimethylpolysiloxane and fluorosilicone oil synthesized by one of the preceding methods.

The fluorosilicone oil with general formula (b) has the preceding formula in which R represents monovalent hydrocarbon groups, for example, alkyl groups such as methyl, ethyl, and propyl, and in which X is a group with the formula $F(CF_2)_aC_2H_4$ or a monovalent hydrocarbon group with the proviso that at least 1 of X is a group with the formula $F(CF_2)_aC_2H_4$. The subscript a is an integer with a value of at least 4, for example, 4, 6, and 8. This fluorosilicone oil encompasses mixtures in which a has several values. The subscript n is an integer with a value of 1 to 300. When n exceeds 300, the viscosity of the oil becomes excessively large and the antifoam of the present invention suffers from a decline in antifoam activity. The preferred oil viscosity falls in the range of 10 to 100,000 centipoise.

Fluorosilicone oils with general formula (b) can be synthesized, for example, by the hydrolysis of fluoroalkylmethyldichlorosilane or by the reaction of fluoroalkylmethyldichlorosilane with zinc oxide in organic solvent to yield alpha,omega-dihydroxyfluoroalkylmethylpolysiloxane oil.

The fluorosilicone oil with general formula (b) may have either a straight chain or cyclic structure. The terminal silanol groups in the alpha, omega-dihydroxyfluoroalkylmethylpolysiloxane oil may as desired be capped with trialkylsiloxy groups by the usual methods.

The microparticulate silica comprising component (B) is to have a specific surface of at least 50 $m^2/g$. When the specific surface falls below 50 $m^2/g$, dispersion is poor and penetration into the foam lamellae is therefore retarded, which prevents the development of an excellent antifoam activity.

Component (B) is exemplified by the fumed and calcined silicas that are produced by dry processes and by the precipitated silica that is produced by a wet process. This component is to be added in the range of 1 to 50 weight parts per 100 weight parts of component (A).

The fluoroalkyl-containing organosilicon compound comprising component (C) is selected from a hydroxyl-endblocked fluorosilicone oil with the following general formula (c)

$HO[F(CF_2)_bC_2H_4SiMeO]_xH$, a cyclic fluorosilicone oil with the following general formula (d)

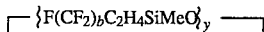

and a fluoroalkyl-containing alkoxysilane with the following general formula (e)

$F(CF22)_bC_2H_4Si(OR^1)_3$ or partial hydrolyzates thereof.

This component is to be added in the range of 0.01 to 25 weight parts per 100 weight parts of component (A).

The hydroxyl-endblocked fluorosilicone oil with general formula (c) has the preceding formula in which the subscript b is an integer with a value of at least 1, for example, 1, 4, 6, and 8. This fluorosilicone oil encompasses mixtures in which b has several values. The subscript x is an integer with a value of 1 to 20.

The cyclic fluorosilicone oil with general formula (d) has the preceding formula in which the subscript b is an integer with a value of at least 1. The subscript y is an integer with a value of 3 to 8, for example, 3, 4, 5, 6, 7, and 8. This fluorosilicone oil encompasses mixtures in which y has several values.

The fluoroalkyl-containing alkoxysilane with general formula (e) or partial hydrolyzates thereof has the preceding formula in which the subscript b is an integer with a value of at least 1. $R^1$ is a monovalent hydrocarbon group having no more than 6 carbon atoms, for example, methyl, ethyl, propyl, butyl, and phenyl.

The invention antifoam is readily prepared by first making up a mixture of components (A), (B), and (C) and then heating this mixture at 60° C. to 200° C. and preferably at 100° C. to 200° C. The preparative method is exemplified as follows:

(i) component (B) is added to component (A), component (C) is added with stirring, and heating and mixing to homogeneity are then carried out; or (ii) component (C) is added to component (B), component (A) is added with stirring, and heating and mixing to homogeneity are then carried out.

The mixer used in the preceding methods is preferably capable of simultaneously carrying out heating and agitation, but the invention is not limited to such mixers. In addition, in order to achieve micronization or homogenization of the invention antifoam, it may be processed with a homomixer, ball mill, colloid mill, or three-roll mill. Mixing may optionally be conducted under an inert gas, e.g., nitrogen.

Heat treatment is conducted in these methods in order to bring about hydrophobicization of the surface of the microparticulate silica comprising component (B) by treatment with the fluoroalkyl-containing organosilicon compound comprising component (C). This heating brings about a condensation reaction between the silanol groups present on the surface of the microparticulate silica (component (B)) and the alkoxy groups in the fluoroalkyl-containing organosilicon compound (component (C)) in order thereby to hydrophobicize the surface of component (B). In order to accelerate this condensation reaction, the addition of a trace quantity of an acidic catalyst such as sulfuric acid to this heat treatment is preferred.

While the invention antifoam is essentially composed of components (A), (B), and (C) as described above, it may also contain the following on an optional basis insofar as the object of the present invention is not impaired: an organic solvent, water, a surfactant, a protective colloid, an organosilane, an organosilazane, aluminum hydroxide, calcium hydroxide, magnesium hydroxide, microparticulate metal oxide, a flake filler, an amino organofunctional silicon compound, or a colorant.

The antifoam in accordance with the present invention can be employed in various formulations depending on the nature of the foaming system. When the foaming system is an oil-based or solvent-based system, the invention antifoam can be used diluted with an organic solvent. This organic solvent is selected from hydrocarbons, halogenated hydrocarbons, amines, alcohols, ethers, ketones, esters, and acid solvents, and it is specifically but limited by methylcyclohexane, xylene, petroleum naphtha, perchloroethylene, bromochloroethane, dichlorobutane, triethylamine, butylamine, tributylamine, isopropyl alcohol, butyl alcohol, amyl alcohol, hexyl ether, butyl Cellosolve, dioxane, methyl ethyl ketone, diethyl ketone, methyl butyl ketone, ethyl acetate, Cellosolve acetate, ethyl propionate, acetic acid, propionic acid, and 2-ethylhexoic acid.

When the foaming system is an aqueous system, the antifoam of the present invention can be used in the form of an emulsion prepared by emulsification using water and known surfactants, The antifoam of the present invention can also be used in the form of a powder antifoam.

When the invention antifoam is added to a foaming aqueous or organic solvent solution, component (B) does not separate and is able to penetrate into the foam lamellae and the antifoam activity of component (A) can develop. The invention antifoam has an antifoam activity superior to that of prior antifoams. It also exhibits an excellent and persistent antifoam activity on the foaming of aqueous solutions and organic solvent solutions in which a silicone surfactant or fluorosurfactant is dissolved, an activity not found in prior silicone antifoams.

The present invention will be explained below using illustrative examples. In the examples and comparison example, parts denotes weight parts and the viscosity is the value measured at 25° C. The cP unit for viscosity indicates centipoise and Me is an abbreviation for the methyl group.

Antifoam Test 200 mL 1.0 weight % of an aqueous solution of a dimethylsilicone-based nonionic surfactant was placed in a 1 L measuring cylinder. After the addition of 0.10 g of the antifoam emulsion, air was bubbled through at 600 mL/minute across a glass ball filter. The time (minutes) required to reach a total foam volume of 800 mL was measured.

Test of the Persistence of the Antifoam Activity 100 mL 1.0 weight % of an aqueous solution of a nonionic fluorosurfactant (Zonyl FSN-100, tradename of the Du Pont Company) was employed as the foaming medium.

0.40 g antifoam was precisely weighed out and combined with tert-butanol to give 100 mL of antifoam solution. 1.0 mL of this antifoam solution was withdrawn with a pipette and added to the foaming medium. After foam generation by shaking in a shaker for 10 seconds, the time (minutes) required for foam disappearance was measured. This procedure was repeated until the time required for foam disappearance reached 5 or more minutes. The number of repetitions (not including the experiment that reached or exceeded 5 minutes) was tentatively called the persistence number and was taken to be indicative of the durability or persistence of the antifoam activity.

EXAMPLE 1

100 parts fluorosilicone oil (viscosity=600 cP) with the formula

Me$_3$SiO(C$_4$F$_9$C$_2$H$_4$SiMeO)$_n$SiMe$_3$ 10 parts fumed silica with a specific surface=200 m$^2$/g, and 2 parts of a hydroxyl-endblocked fluorosilicone oil with the formula HO[CF$_3$C$_2$H$_4$SiMeO]$_x$H (n=3 on average)

were mixed at room temperature for 1 hour, heated and mixed at 160° C. for 2 hours, and then cooled. The antifoam was then prepared by the addition of 0.01 parts of sulfuric acid to the mixture and mixing at 60° C. for 2 hours. This antifoam was subjected to the antifoam and antifoam persistence tests, and these results are reported in Table 1.

EXAMPLE 2

18.8 g of a disiloxane with the formula

{F(CF$_2$)$_4$C$_2$H$_4$SiMe$_2$}$_2$O, 111 g octamethylcyclotetrasiloxane, and 1.3 g ion-exchange resin catalyst Amberlyst 15 from the Aldrich Chemical Company were placed in a flask and mixed at 65° C. for 22 hours. The reaction mixture was suction-filtered in order to remove the catalyst, and the volatiles were then removed at 150° C. in vacuo to yield 115 g liquid polysiloxane. This polysiloxane was confirmed by gel permeation chromatographic (GPC) analysis to be a fluorosilicone oil with the following formula.

F(CF$_2$)$_4$C$_2$H$_4$SiMe$_2$O(Me$_2$SiO)$_{45}$SiMe$_2$C$_2$H$_4$(CF$_2$)$_4$F

This oil had a density of 1.014, refractive index of 1.3950, and surface tension of 19.9 mM/m.

100 parts of the fluorosilicone oil synthesized as above, 10 parts fumed silica with a specific surface=250 m$^2$/g, and 2 parts of a cyclic fluorosilicone oil with the formula

[F(CF$_2$)$_4$C$_2$H$_4$SiMeO]$_3$ were mixed at room temperature for 1 hour and then heated and mixed at 170° C. for 3 hours. The antifoam was then obtained by the addition of 0.01 parts of sulfuric acid to the mixture and mixing for 2 hours at 60° C. This antifoam was subjected to the antifoam and antifoam persistence tests, and these results are reported in Table 1.

EXAMPLE 3

41 g of disiloxane with the formula

{F(CF$_2$)$_8$C$_2$H$_4$SiMe$_2$}$_2$O, 84 g of dimethylcyclosiloxane mixture, and 1.3 g ion-exchange resin catalyst Amberlyst 15 from the Aldrich Chemical Company were placed in a flask and mixed at 65° C. for 30 hours. The reaction mixture was suction-filtered in order to remove the catalyst, and the volatiles were then removed at 150° C. in vacuo to yield 115 g of polysiloxane. This polysiloxane was confirmed by gel permeation chromatographic (GPC) analysis to be a fluorosilicone with the following formula.

F(CF$_2$)$_8$C$_2$H$_4$SiMe$_2$O(Me$_2$SiO)$_{25}$SiMe$_2$C$_2$H$_4$(CF$_2$)$_8$F

This oil had a density of 1.113, a refractive index of 1.3828, and a low surface tension of 18.1 mM/m.

The antifoam was prepared by first mixing 50 parts of fluorosilicone oil synthesized as above, 50 parts of afluorosilicone oil (viscosity=600 cP) with the formula Me$_3$SiO(C$_4$F$_9$C$_2$H$_4$SiMeO)$_n$SiMe$_3$, 10 parts of fumed silica with specific surface=200 m$^2$/g, and 2 parts fluoroakyl-containing alkoxysilane with the formula F(CF$_2$)$_4$C$_2$H$_4$Si(OMe)$_3$ at room temperature for 1 hour and then mixing at 160° C. for 2 hours. This antifoam was subjected to the antifoam and antifoam persistence tests, and these results are reported in Table 1.

EXAMPLE 4

100 g of fumed silica with a specific surface=200 m$^2$/g was sprayed with 20 g of fluoroalkyl-containing alkoxysilane CF$_3$C$_2$H$_4$Si(OMe)$_3$ while stirring in a flask. Stirring for an additional 2 hours at 150° C. in a nitrogen current gave a hydrophobicized silica. 10 parts of this silica was mixed with 100 parts of the fluorosilicone oil synthesized in Example 2 and 0.01 parts sulfuric acid was added. The antifoam was prepared by stirring for 2 hours at 60° C., cooling, and neutralization by the addition of the equivalent quantity of sodium bicarbonate. This antifoam was subjected to the antifoam and antifoam persistence tests, and these results are reported in Table 1.

COMPARISON EXAMPLE 1

The antifoam was prepared by mixing 100 parts of a fluorosilicone oil with the formula $$Me_3SiO(CF_3C_2H_4SiMeO)_nSiMe_3$$

with 10 parts of fumed silica with a specific surface=200 m²/g for 1 hour. This antifoam was subjected to the antifoam and antifoam persistence tests, and these results are reported in Table 1.

TABLE 1

| Antifoam | Antifoam Test Time (Minutes) | Antifoam Persistence Test Persistence Number |
|---|---|---|
| Example 1 | 30 | 10 |
| Example 2 | 33 | 11 |
| Example 3 | 28 | 14 |
| Example 4 | 30 | 10 |
| Comparison Example 4 | 6 | 1 |

Because the antifoam composition of the present invention consists of components (A), (B), and (C) as described hereinbefore, this antifoam composition exhibits an excellent and persistent antifoam activity against the foaming of aqueous or organic solvent solutions in which a silicone surfactant or fluorosurfactant is dissolved.

Other variations and modifications may be made in the compounds, compositions, and methods, described herein without departing from the essential features and concepts of the present invention. The forms of the invention described herein are exemplary only and are not intended as limitations on the scope of the invention as defined in the appended claims.

That which is claimed is:

1. A fluorosilicone antifoam comprising:

(A) 100 weight parts of a silicone oil selected from the group consisting of (a) a fluorosilicone oil with the formula $$F(CF_2)_aC_2H_4SiMe_2O(Me_2SiO)_nSiMe_2C_2H_4(CF_2)_aF$$

in which a is an integer with a value of at least 4, n is an integer with a value of 0 to 300, and Me is methyl, and (b) a fluorosilicone oil with the formula $$XR_2SiO\{F(CF_2)_aC_2H_4SiMeO\}_nSiR_2X$$

in which R is a monovalent hydrocarbon group, X is the $F(CF_2)_aC_2H_4$ group or a monovalent hydrocarbon group with the proviso that at least 1 of X is the $F(CF_2)_aC_2H_4$ group, n is an integer with a value of 1 to 300, and a is an integer with a value of at least 4;

(B) 1 to 50 weight parts of microparticulate silica with a specific surface of at least 50 m²/g; and (C) 0.01 to 25 weight parts of a fluoroalkyl-containing alkoxysilane with the formula $$F(CF_2)_bC_2H_4Si(OR^1)_3$$

in which b is an integer with a value of at least 1 and $R^1$ is a monovalent hydrocarbon group having no more than 6 carbons, or partial hydrolyzates thereof; to give a hydrophobized silica.

* * * * *